United States Patent
Zhao et al.

(10) Patent No.: US 8,355,062 B2
(45) Date of Patent: Jan. 15, 2013

(54) METHOD AND APPARATUS FOR PROCESSING IMAGE

(75) Inventors: Song Zhao, Shenzhen (CN); Jing Wang, Shenzhen (CN); Yuan Liu, Shenzhen (CN); Kai Li, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 67 days.

(21) Appl. No.: 13/189,058

(22) Filed: Jul. 22, 2011

(65) Prior Publication Data
US 2011/0273594 A1 Nov. 10, 2011

Related U.S. Application Data

(63) Continuation of application No. PCT/CN2010/070269, filed on Jan. 21, 2010.

(30) Foreign Application Priority Data

Jan. 22, 2009 (CN) .......................... 2009 1 0036908

(51) Int. Cl.
*H04N 5/262* (2006.01)
*G06K 9/32* (2006.01)
(52) U.S. Cl. ..................................... 348/240.2; 382/298
(58) Field of Classification Search ............... 348/240.2, 348/581; 382/298, 299, 300
See application file for complete search history.

(56) References Cited

U.S. PATENT DOCUMENTS

| | | | |
|---|---|---|---|
| 7,035,479 B2 * | 4/2006 | Coffland | 382/298 |
| 7,710,469 B2 * | 5/2010 | Ueyama | 348/240.2 |
| 8,160,398 B1 * | 4/2012 | Avidan et al. | 382/298 |
| 2003/0025812 A1 * | 2/2003 | Slatter | 348/240.2 |
| 2004/0001636 A1 | 1/2004 | Miceli et al. | |
| 2004/0066467 A1 | 4/2004 | Hahn | |
| 2004/0252232 A1 | 12/2004 | Lodder et al. | |
| 2005/0025387 A1 * | 2/2005 | Luo | 382/298 |
| 2005/0046645 A1 * | 3/2005 | Breton et al. | 345/660 |
| 2007/0097261 A1 | 5/2007 | Smith et al. | |
| 2007/0253626 A1 | 11/2007 | Jeffrey et al. | |
| 2008/0279422 A1 * | 11/2008 | Matsuzawa | 382/106 |
| 2009/0153730 A1 * | 6/2009 | Knee et al. | 348/445 |
| 2010/0238294 A1 * | 9/2010 | H gasten et al. | 348/164 |

(Continued)

FOREIGN PATENT DOCUMENTS
CN 1343341 A 4/2002
(Continued)

OTHER PUBLICATIONS

International Search Report issued in corresponding PCT Patent Application No. PCT/CN2010/070269, mailed Apr. 15, 2010.

(Continued)

*Primary Examiner* — John Villecco

(74) *Attorney, Agent, or Firm* — Brinks Hofer Gilson & Lione

(57) ABSTRACT

A method for processing an image includes: obtaining depth values of an image including a target region and a non-target region; obtaining a scaling ratio of the target region; obtaining a scaling ratio of the non-target region according to the depth values of the image and the scaling ratio of the target region; scaling respectively the target region and the non-target region according to the scaling ratio of the target region and the scaling ratio of the non-target region, and obtaining a scaled image.

8 Claims, 3 Drawing Sheets

U.S. PATENT DOCUMENTS

| | | | |
|---|---|---|---|
| 2011/0141319 A1* | 6/2011 | Watazawa | 348/240.2 |
| 2011/0170802 A1* | 7/2011 | Liu et al. | 382/298 |
| 2011/0182502 A1* | 7/2011 | Liang | 382/162 |
| 2012/0242796 A1* | 9/2012 | Ciurea et al. | 348/46 |

FOREIGN PATENT DOCUMENTS

| | | |
|---|---|---|
| CN | 101325040 A | 12/2008 |
| CN | 101789235 B | 12/2011 |
| EP | 1986152 A2 | 10/2008 |
| WO | WO 200052640 A1 | 9/2000 |
| WO | WO 2007/096816 A2 | 8/2007 |

OTHER PUBLICATIONS

Setlur, et al., "Automatic Image Retargeting-Fitting Big Pictures in Small Displays" Nokia. MUM 2005.

Avidan et al., "Seam Carving for Content-Aware Image Resizing" Mitsubishi Electric Research Labs and the Interdisciplinary Center & MERL. 2007.

Wolf, et al., "Non-homogeneous Content-driven Video-retargeting", The School of Computer Science, Tel-Aviv University, IEEE 2007.

Extended European Search Report issued in corresponding European Patent Application No. 10733224.9, mailed Aug. 2, 2012.

Written Opinion of the International Searching Authority issued in corresponding PCT Patent Application No. PCT/CN2010/070269, mailed Apr. 15, 2010.

First Office Action issued in corresponding Chinese Patent Application No. 200910036908.7; (including English Translation and Verification of Translation); mailed Mar. 22, 2011.

Notification of Allowance issued in corresponding Chinese Patent Application No. 200910036908.7; (including English Translation and Verification of Translation); mailed Oct. 20, 2011.

English Translation of granted claims from corresponding Chinese Patent Application No. 200910036908.7; (including Verification of Translation, 2012.

* cited by examiner

METHOD AND APPARATUS FOR PROCESSING IMAGE

CROSS-REFERENCE TO RELATED APPLICATIONS

This application is a continuation of International Application No. PCT/CN2010/070269, filed on Jan. 21, 2010, which claims priority to Chinese Patent Application No. 200910036908.7, filed on Jan. 22, 2009, both of which are hereby incorporated by reference in their entireties.

FIELD OF THE DISCLOSURE

The present application relates to a digital image processing technology, and in particular, to a method and an apparatus for processing an image.

BACKGROUND

In the field of digital image processing, scaling of an image is equivalent to the "zoom in" or "zoom out" at the time of a camera taking photos of a scene, where image amplification equals to "zoom in" and image reduction equals to "zoom out". The degree of zooming of objects relates to the relative positions of the objects during the formation of the image.

However, in conventional art, when scaling an image using an image scaling algorithm, a same scaling ratio will be used for scaling the image. It does not take into account the relative positions of the objects during the formation of the image. Accordingly; the scaled image thus obtained is a planar image and does not accord with the depth relations in the scene.

SUMMARY

A method and an apparatus for processing an image to realize that an image after scaling is a scaled image according with depth relations in the scene is provided.

A method for processing an image includes:
obtaining depth values of an image, where the image includes a target region and a non-target region;
obtaining a scaling ratio of the target region;
obtaining a scaling ratio of the non-target region according to the depth values of the image and the scaling ratio of the target region;
scaling respectively the target region and the non-target region according to the scaling ratio of the target region and the scaling ratio of the non-target region, and obtaining a scaled image.

An apparatus for processing an image includes
a first obtaining unit, configured to obtain depth values of an image including a target region and a non-target region;
a second obtaining unit, configured to obtain a scaling ratio of the target region;
a third obtaining unit, coupled to the first obtaining unit and the second obtaining unit, configured to obtain a scaling ratio of the non-target region according to the depth value of the image and the scaling ratio of the target region;
a scaling processing unit, coupled to the second obtaining unit and the third obtaining unit, configured to respectively scale the target region and the non-target region according to the scaling ratio of the target region and the scaling ratio of the non-target region, and obtain a scaled image.

When implementing the embodiments of the present disclosure, because a depth value of the target region of the image differs from a depth value of the non-target region of the image, in an actual scene, the scaling ratio of the target region differs from the scaling ratio of the non-target region. Therefore, the scaling ratio of the non-target region is obtained according to the depth values of the image and the scaling ratio of the target region. Then, the target and non-target regions are respectively scaled according to the respective scaling ratios for the target and non-target regions, and an image according with the depth relations in the scene is obtained.

BRIEF DESCRIPTION OF THE DRAWINGS

The drawings as described in the following illustrate some preferred embodiments of the present disclosure. For those skilled in the art, other drawings can be derived from these drawings without creative effort.

DETAILED DESCRIPTION OF THE EMBODIMENTS

Below, reference will be made to the accompany drawings to further describe the present disclosure in detail.

Figure 1:
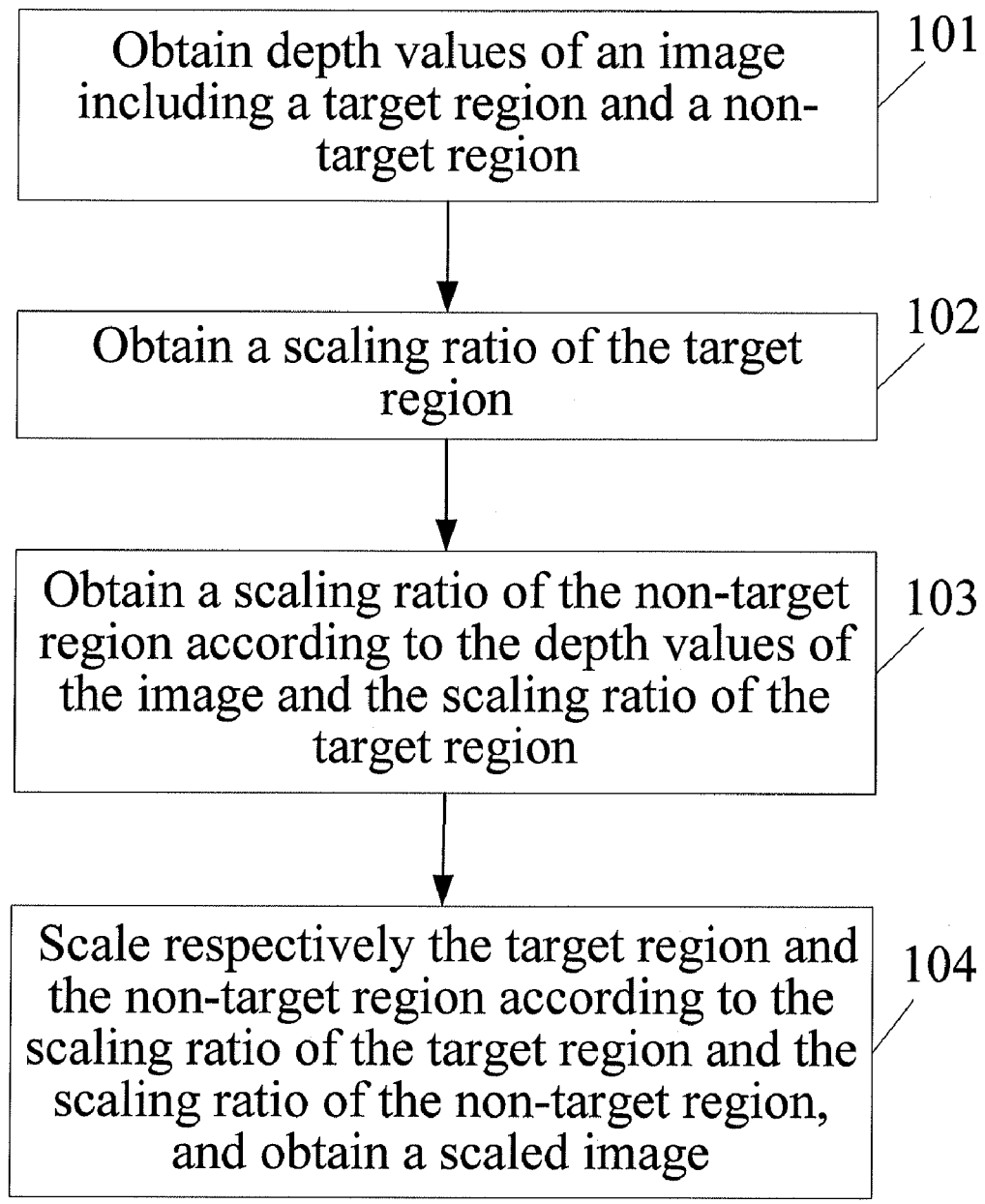
FIG. 1 is a flow chart of a method for processing an image according to a first embodiment of the present disclosure.

FIG. 1 is a flow chart of a method for processing an image according to a first embodiment of the present disclosure. The flow includes:

Step 101: Obtain depth values of an image, where the image includes a target region and a non-target region.

The depth values include a depth value of the target region and a depth value of the non-target region. A depth value of an image expresses a difference value between the maximum value in the image data and an actual depth value of the image obtained by a depth camera. The depth value of the image expresses a depth relation of the scene as represented by the image data. The depth relation is a relative relation, and a value of the depth relation does not bear a physical meaning. The actual depth value of an image is obtained by taking a photograph using a depth camera. If the maximum value for representing the image data is 255, then the depth value of the image is a difference between 255 and the actual depth value of the image obtained by the depth camera.

Step 102: Obtain a scaling ratio of the target region;

The scaling ratio of the target region is specified according to user requirements. The scaling ratio of the target region is stored in a storage medium. When the image is scaled, the scaling ratio of the target region is obtained from the storage medium.

Step 103: Obtain a scaling ratio of the non-target region according to the depth values of the image and the scaling ratio of the target region;

When there is one non-target region, the scaling ratio of the non-target region is obtained according to the depth values of the image and the scaling ratio of the target region. The scaling ratio of the non-target region is $$b = \frac{k + \alpha_D}{1 + \alpha_D},$$

where k is the scaling ratio of the target region, $\alpha_D$ is computed according to the depth value of the non-target region and the depth value of the target region, and $\alpha_D$ can be the depth value of the non-target region or the depth value of the target region minus one.

Step 104: Scale respectively the target region and the non-target region according to the scaling ratio of the target region and the scaling ratio of the non-target region, and obtain a scaled image.

The target region and the non-target region can be scaled using methods such as bilinear interpolation, linear interpolation, cubic convolution or content-based scaling.

When implementing the first embodiment of the present disclosure, by obtaining depth values of an image including a target region and a non-target region, obtaining a scaling ratio of the target region, obtaining a scaling ratio of the non-target region according to the depth values of the image and the scaling ratio of the target region, and respectively scaling the target region and the non-target region according to the scaling ratio of the target region and the scaling ratio of the non-target region to obtain a scaled image, an image according with depth relations in a scene is obtained.

Herein, the image is a digital image with depth values. When a region is divided with rectangles, an average of depth values of all points within these rectangles is computed as the depth value of the region. A square belongs to the category of rectangle. When the region is divided with squares, an average of depth values of all points within these squares is computed as the depth value of the region. The scaling ratios of the target region may include a plurality of target scaling ratios. The target scaling ratios comply with $$b = \frac{k + \alpha_D}{1 + \alpha_D}.$$

Figure 2:
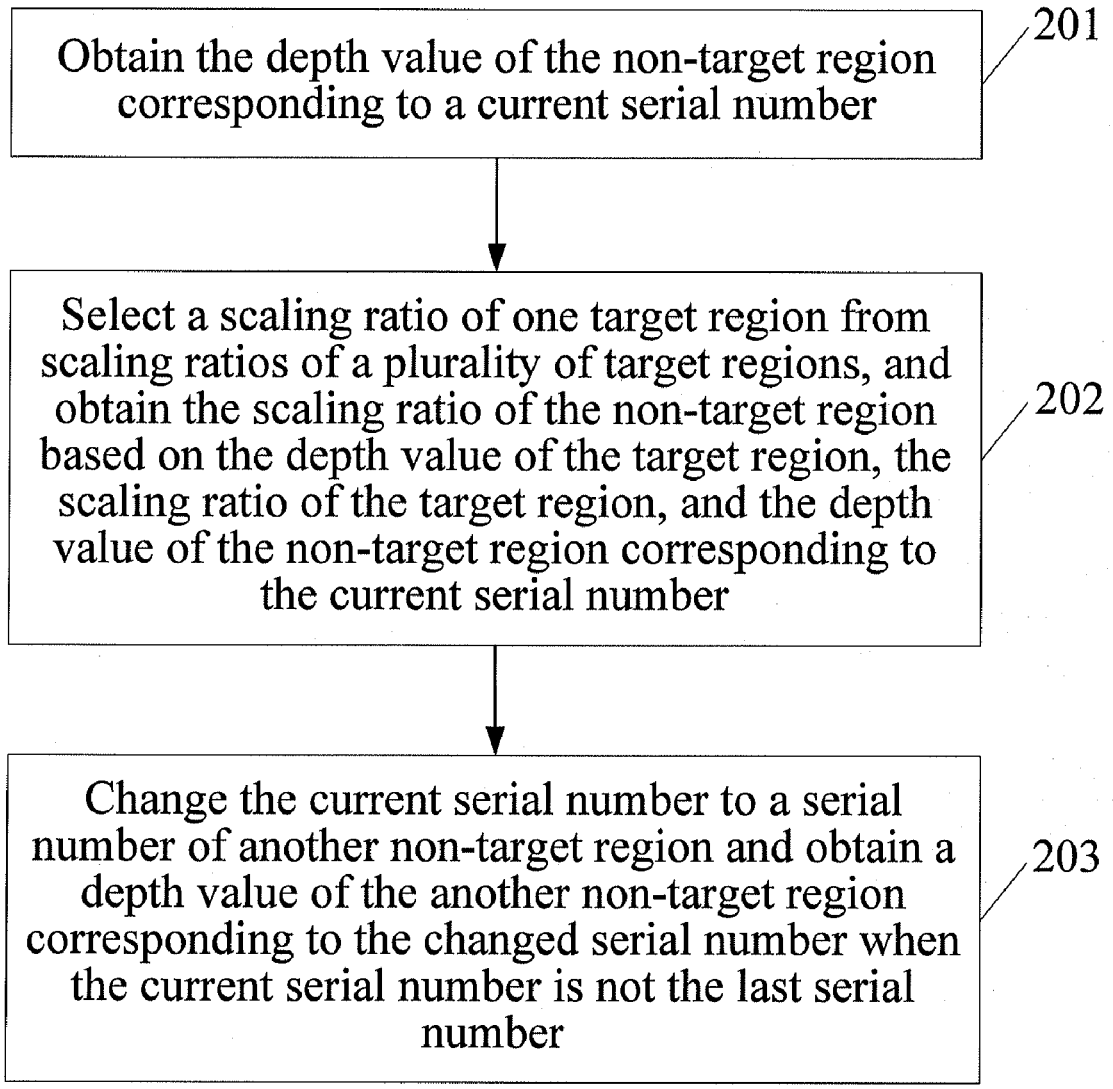
FIG. 2 is a flow chart of obtaining a scaling ratio of a non-target region in the method for processing an image according to a second embodiment of the present disclosure.

Consider a region corresponding to a target scaling ratio among a plurality of target scaling ratios as the target region and consider the regions corresponding to remaining target scaling ratios as non-target regions. When the number of non-target regions is greater than 1, sequence the non-target regions with serial numbers and then obtain the sequenced serial numbers. FIG. 2 is a flow chart of obtaining a scaling ratio of a non-target region in the method for processing an image according to a second embodiment of the present invention. The flow includes:

Step 201: Obtain a depth value of the non-target region corresponding to a current serial number.

Step 202: Select a scaling ratio of one target region from scaling ratios of a plurality of target regions, and obtain a scaling ratio of the non-target region according to the depth value of the target region, the scaling ratio of the target region, and the depth value of the non-target region corresponding to the current serial number.

The scaling ratios of the plurality of the target regions are specified according to user requirements, stored in a storage medium, and obtained from the storage medium when the image is being scaled.

Step 203: Change the current serial number to a serial number of another non-target region and obtain a depth value of the another non-target region corresponding to the changed serial number when the current serial number is not the last serial number.

In the second embodiment of the present disclosure discussed above, the scaling ratios of the target regions may include a scaling ratio of one target region. In this case, step 202 is: obtaining the scaling ratio of the non-target region according to the depth value of the target region, the scaling ratio of the target region, and the depth value of the non-target region corresponding to the current serial number. When the number of the non-target regions is greater than 1, these non-target regions can be sequenced in a coordinate system and coordinates can be obtained.

In implementing the second embodiment, since in the image, the depth value of the target region differs from the depth value of the non-target region, and in an actual scene the scaling ratio of the target region also differs from the scaling ratio of the non-target region, the scaling ratio of the non-target region is obtained according to the depth values of the image and the scaling ratio of the target region. Then, the target region and the non-target region are scaled according to the scaling ratio of the target region and the scaling ratio of the non-target region, respectively, and an image according with depth relations in the scene is obtained.

In the following, a specific example is provided for illustrating the above-mentioned method for processing an image in detail.

An image is divided into four non-target regions e, f, g, h and one target region i. In this embodiment, the value used to represent the image data is data between 0 and 255. The actual depth values of the image, which are obtained by a depth camera, are as follows: the actual depth value of e is 100, the actual depth value of f is 101, the actual depth value of g is 102, the actual depth value of h is 103, the actual depth value of i is 104. Obtain the depth values of e, f, g, h, and i, where the depth value of e is 255−100=155, the depth value of f is 255−101=154, the depth value of g is 255−102=153, the depth value of h is 255−103=152, and the depth value of i is 255−104=151. Sequence e, f, g and h in a coordinate system and obtain the sequenced coordinates. Obtain the scaling ratio of i, which is 2, from the storage medium. Then, execute the following steps.

A1. Obtain the depth value of e corresponding to the current coordinate.

A2. Obtain the scaling ratio of e, according to the depth value 151 of i, the scaling ratio 2 of i, and the depth value 155 of e corresponding to current coordinates.

The scaling ratio of the non-target region is computed according to $$b = \frac{k + \alpha_D}{1 + \alpha_D},$$

where k is the scaling ratio of the target region, $\alpha_D$ may be the depth value of the non-target region or the depth value of the target region minus one. According to this equation, the scaling ratio of e is computed to be 306/155.

A3. When the current coordinate is not the last coordinate, change the current coordinate to one of the coordinates of b, c, and d, obtain the depth values corresponding to the changed coordinates, and execute A2 and A3 in succession.

According to steps A1, A2 and A3, obtain the scaling ratio for the depth value corresponding to each coordinate one by one. The obtained results are: the scaling ratio 305/154 for f, the scaling ratio 304/153 for g, and the scaling ratio 303/152 for h.

Obtain a scaled image by respectively scaling e, f, g, h, and i adopting bilinear interpolation, according to the scaling ratio 306/155 for e, the scaling ratio 305/154 for f, the scaling ratio 304/153 for g, the scaling ratio 303/152 for h, and the scaling ratio 2 for i.

In implementing the method in the embodiment of the present disclosure, since in the image, the depth value of the target region differs from the depth value of the non-target region, and in an actual scene the scaling ratio of the target region also differs from the scaling ratio of the non-target region, the scaling ratio of the non-target region is obtained according to the depth values of the image and the scaling ratio of the target region. Then, the target region and the non-target region are scaled respectively according to the scaling ratio of the target region and the scaling ratio of the non-target region, and an image according with depth relations in the scene is obtained.

An apparatus for processing an image corresponding to foregoing embodiments is described below in detail.

Figure 3:
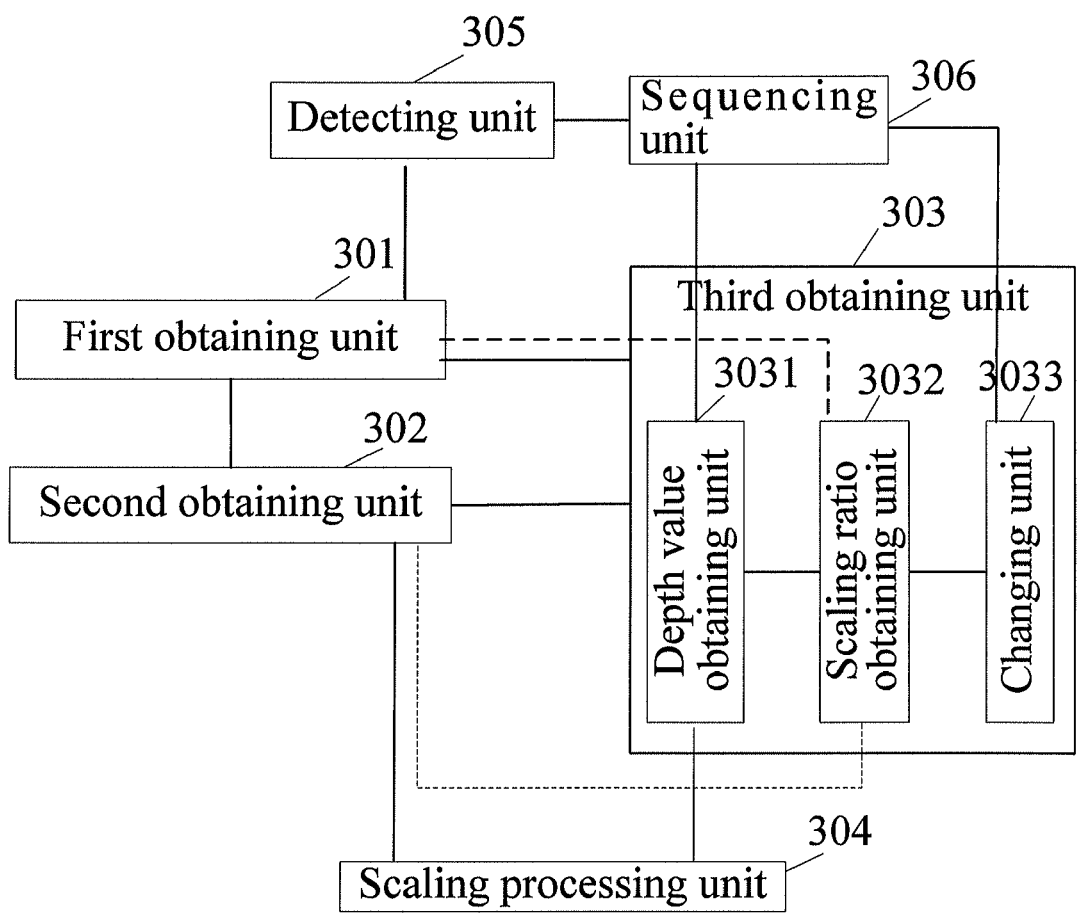
FIG. 3 is a schematic diagram depicting an apparatus for processing an image according to an embodiment of the present disclosure.

FIG. 3 is a schematic diagram depicting an apparatus for processing an image according to an embodiment of the present disclosure. The apparatus includes:

a first obtaining unit 301, configured to obtain depth values of an image including a target region and a non-target region;

a second obtaining unit 302, configured to obtain a scaling ratio of the target region;

where the scaling ratio of the target region is specified according to user requirements, stored in a storage medium, and obtained by the second obtaining unit 302 from the storage medium when the image is being scaled;

a third obtaining unit 303, coupled to the first obtaining unit and the second obtaining unit, configured to obtain a scaling ratio of the non-target region according to the depth values of the image and the scaling ratio of the target region;

a scaling processing unit 304, coupled to the second obtaining unit and the third obtaining unit, configured to respectively scale the target region and the non-target region according to the scaling ratio of the target region and the scaling ratio of the non-target region and obtain a scaled image.

The apparatus further includes:

a detecting unit 305, configured to detect whether the number of non-target regions is greater than 1;

a sequencing unit 306, configured to sequence the non-target regions with serial numbers and obtain the sequenced serial numbers, when the detection unit 305 detects that the number of non-target regions is greater than 1.

The third obtaining unit 303 further includes:

a depth value obtaining unit 3031, coupled to the sequencing unit 306, configured to obtain a depth value of a non-target region corresponding to a current serial number;

a scaling ratio obtaining unit 3032, coupled to the second obtaining unit 302, the depth value obtaining unit 3031 and the first obtaining unit 301, configured to select a scaling ratio of one target region when there are scaling ratios of a plurality of target regions, and to obtain a scaling ratio of the non-target region corresponding to the current serial number according to a selected depth value of the target region, the scaling ratio of the target region, and the depth value of the non-target region corresponding to the current serial number;

a changing unit 3033, coupled to the scaling ratio obtaining unit 3032 and the sequencing unit 306, configured to change the current serial number to a serial number of another non-target region and to obtain a depth value of the another non-target region corresponding to the changed serial number.

The above-mentioned data processing apparatus may be set in a digital camera or in a video camera.

Through the description of the above embodiments, a person skilled in the art will clearly understand that the present disclosure may be implemented by software plus a necessary general-purpose hardware platform. The present disclosure may also be implemented by hardware. All or the part of the present disclosure may be embodied in the form of a computer software product. The computer software product may be stored in a computer-readable storage medium such as; for example, a floppy disk, a hard disk or an optical disk of a computer, and may comprise instructions to enable a computer device (may be, but not limited to, a personal computer, a server, or a network device) to execute the methods of the embodiments of the present disclosure.

In implementing the embodiments of the present disclosure, since in the image, the depth value of the target region differs from the depth value of the non-target region, and in an actual scene the scaling ratio of the target region also differs from the scaling ratio of the non-target region, the scaling ratio of the non-target region is obtained according to the depth values of the image and the scaling ratio of the target region. Then, the target region and the non-target region are scaled respectively according to the scaling ratio of the target region and the scaling ratio of the non-target region, and an image according with depth relations in the scene is obtained.

The foregoing disclosure is some preferred embodiments of the present disclosure. They shall not be construed as limits to the present disclosure. Therefore, equivalent alterations made according to the claims of the present disclosure are still covered by the scope of the present disclosure.

We claim:

1. A method for processing an image, comprising:
obtaining depth values of an image including a target region and a non-target region;
obtaining a scaling ratio of the target region;
obtaining a scaling ratio of the non-target region according to the depth values of the image and the scaling ratio of the target region, wherein the scaling ratio of the non-target region is $$b = \frac{k + \alpha_D}{1 + \alpha_D},$$

wherein k is the scaling ratio of the target region, and $\alpha_D$ is computed according to a ratio of a depth value of the non-target region to a depth value of the target region;
scaling respectively the target region and the non-target region according to the scaling ratio of the target region and the scaling ratio of the non-target region, and obtaining a scaled image.

2. The method for processing an image according to claim 1, wherein a mode for dividing the target region comprises dividing by rectangles.

3. The method for processing an image according to claim 2, wherein when the target region is divided by rectangles, and an average of depth values of all points within the rectangles is computed to be the depth value of the target region.

4. The method for processing an image according to claim 1, wherein the scaling ratio of the target region comprises scaling ratios of a plurality of target regions.

5. The method for processing an image according to claim 4, wherein the method further comprises: when the number of non-target regions is greater than 1, sequencing the non-target regions with serial numbers, and obtaining sequenced serial numbers;
wherein the obtaining the scaling ratio of the non-target region comprises:
obtaining the depth value of the non-target region corresponding to a current serial number;
selecting a scaling ratio of one target region from scaling ratios of a plurality of target regions, obtaining the scaling ratio of the non-target region according to the depth value of the target region, the scaling ratio of the target region, and the depth value of the non-target region corresponding to the current serial number;

when the current serial number is not the last serial number, changing the current serial number to a serial number of another non-target region, and obtaining a depth value of the another non-target region corresponding to the changed serial number.

6. An apparatus for processing an image, comprising:

a first obtaining unit, configured to obtain depth values of an image including a target region and a non-target region;

a second obtaining unit, configured to obtain a scaling ratio of the target region;

a third obtaining unit, configured to obtain a scaling ratio of the non-target region according to the depth values of the image and the scaling ratio of the target region, wherein the scaling ratio of the non-target region is $$b = \frac{k + \alpha_D}{1 + \alpha_D},$$

wherein k is the scaling ratio of the target region, and $\alpha_D$ is computed according to a ratio of a depth value of the non-target region to a depth value of the target region;

a scaling processing unit, configured to respectively scale the target region and the non-target region according to the scaling ratio of the target region and the scaling ratio of the non-target region and to obtain a scaled image.

7. The apparatus for processing an image according to claim 6, further comprising:

a detecting unit, configured to detect whether the number of non-target regions is greater than 1;

a sequencing unit, configured to sequence the non-target regions with serial numbers and obtain sequenced serial numbers, when the detection unit detects that the number of non-target regions is greater than 1;

the third obtaining unit further comprises:

a depth value obtaining unit, connected with the sequencing unit and configured to obtain the depth value of the non-target region corresponding to a current serial number;

a scaling ratio obtaining unit, connected with the second obtaining unit, the depth value obtaining unit and the first obtaining unit and configured to select a scaling ratio of one target region when there are scaling ratios of a plurality of target regions, and obtain the scaling ratio of the non-target region corresponding to the current serial number according to a selected depth value of the target region, the scaling ratio of the target region, and the depth value of the non-target region corresponding to the current serial number; and a changing unit, connected with the scaling ratio obtaining unit and the scaling ratio obtaining unit and configured to modify the current serial number to a serial number of another non-target region and obtain a depth value of the another non-target region corresponding to the changed serial numbers, when the current serial number is not the last serial number.

8. The apparatus for processing an image according to claim 6, wherein the apparatus is set in a digital camera or a video camera.

* * * * *